United States Patent
Takawale et al.

(10) Patent No.: US 10,515,002 B2
(45) Date of Patent: Dec. 24, 2019

(54) UTILIZING ARTIFICIAL INTELLIGENCE TO TEST CLOUD APPLICATIONS

(71) Applicant: Accenture Global Solutions Limited, Dublin (IE)

(72) Inventors: Paresh Takawale, Pune (IN); Dnyaneshwar Gangaram Dhumal, Pune (IN); Garima Gupta, Pune (IN); Mukul Dilip Patidar, Pune (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 15/864,610

(22) Filed: Jan. 8, 2018

(65) Prior Publication Data

US 2019/0213115 A1    Jul. 11, 2019

(51) Int. Cl.
*G06F 9/44* (2018.01)
*G06F 11/36* (2006.01)
(Continued)

(52) U.S. Cl.
CPC ............ *G06F 11/3684* (2013.01); *G06F 8/30* (2013.01); *G06F 11/3676* (2013.01);
(Continued)

(58) Field of Classification Search
CPC .... G06F 8/30; G06F 11/3664; G06F 11/3668; G06F 11/3672; G06F 11/3676; G06F 11/3684; G06F 11/3688; G06F 11/3692; G06F 11/3696; G06N 5/022; G06N 5/046; G06N 99/005; G06N 20/00
(Continued)

(56) References Cited

U.S. PATENT DOCUMENTS

| 8,640,106 B2* | 1/2014 | Weigert ............... G06F 8/10 717/126 |
| 2016/0170972 A1* | 6/2016 | Andrejko ........... G06F 17/2735 704/9 |

(Continued)

OTHER PUBLICATIONS

Oasis, "ebXML Test Framework DRAFT Document", 2002, version 0.91, The Organization for the Advancement of Structured Information Standards, 92 pages (Year: 2002).*

(Continued)

*Primary Examiner* — Ted T. Vo
(74) *Attorney, Agent, or Firm* — Harrity & Harrity, LLP

(57) ABSTRACT

A device receives application information associated with a cloud application provided in a cloud computing environment, and utilizes a first AI model to generate test cases and test data based on the application information. The device utilizes a second AI model to generate optimized test cases and optimized test data based on the test cases and the test data, and utilizes a third AI model to generate test classes based on the optimized test cases and the optimized test data. The device executes the test classes to generate results, and utilizes a fourth AI model to generate an analysis of the results, recommendations for the cloud application based on the analysis of the results, or a code coverage report associated with the cloud application. The device automatically causes an action to be performed based on the analysis of the results, the recommendations, or the code coverage report.

24 Claims, 10 Drawing Sheets

(51) Int. Cl.
  *G06N 5/02*   (2006.01)
  *G06N 5/04*   (2006.01)
  *G06F 8/30*   (2018.01)
  *G06N 20/00*   (2019.01)

(52) U.S. Cl.
  CPC ...... *G06F 11/3688* (2013.01); *G06F 11/3692* (2013.01); *G06N 5/022* (2013.01); *G06N 5/046* (2013.01); *G06N 20/00* (2019.01)

(58) Field of Classification Search
  USPC .................................................. 717/124–135
  See application file for complete search history.

(56) References Cited

U.S. PATENT DOCUMENTS

2016/0314056 A1* 10/2016 Greene ............... G06F 11/3612
2017/0199811 A1* 7/2017 Narayan ............. G06F 11/3684

OTHER PUBLICATIONS

Chavali, "Automation of a Cloud Hosted Application—Performance, Automated Testing, Cloud Computing", 2016, Blekinge Institute of Technology, Sweden, 56 pages (Year: 2016).*

Parnami et al., "A Survey on Generation of Test Cases and Test Data Using Artificial Intelligence Techniques", 2012, Universal Association of Computer and Electronics Engineers., pp. 196-198 (Year: 2012).*

Bhagyashree et al., "Use of Artificial Intelligence in Software Development Life Cycle . . . A state of the art review", 2015, Maharashtra Institute of Technology, Pune, India, 5 pages (Year: 2015).*

Badlaney et al., "An Introduction to Data-Flow Testing", 2006, Department of Computer Science, North Carolina State University, 8 pages (Year: 2006).*

* cited by examiner

UTILIZING ARTIFICIAL INTELLIGENCE TO TEST CLOUD APPLICATIONS

BACKGROUND

Cloud computing has seen increasing use for a variety of reasons, including cost savings, ease of maintenance, scalability, and versatility. Cloud computing provides many different types of cloud applications, such as information as a service (IaaS) applications (e.g., information technology applications, networking applications, data storage applications, etc.), platform as a service (PaaS) applications (e.g., hardware applications, operating system applications, etc.), and software as a service (SaaS) applications (e.g., email applications, word processing applications, image applications, etc.).

SUMMARY

According to some implementations, a device may include one or more memories, and one or more processors, communicatively coupled to the one or more memories, to receive application information associated with a cloud application provided in a cloud computing environment, and utilize a first artificial intelligence model to generate test cases and test data based on the application information. The one or more processors may utilize a second artificial intelligence model to generate optimized test cases and optimized test data based on the test cases and the test data, and may utilize a third artificial intelligence model to generate test classes based on the optimized test cases and the optimized test data. The one or more processors may execute the test classes to generate results, and may utilize a fourth artificial intelligence model to generate at least one of an analysis of the results, one or more recommendations for the cloud application based on the analysis of the results, or a code coverage report associated with the cloud application. The one or more processors may automatically cause an action to be performed based on the at least one of the analysis of the results, the one or more recommendations, or the code coverage report, where the action is associated with the cloud application.

According to some implementations, a non-transitory computer-readable medium may store instructions that include one or more instructions that, when executed by one or more processors, cause the one or more processors to receive, from a user device, a request to test a cloud application provided in a cloud computing environment, and receive application information associated with the cloud application based on the request. The one or more instructions may cause the one or more processors to utilize a first machine learning model to generate test cases based on the application information, and utilize a second machine learning model to generate optimized test cases based on the test cases. The one or more instructions may cause the one or more processors to utilize a third machine learning model to generate test classes based on the optimized test cases, and execute the test classes to generate results. The one or more instructions may cause the one or more processors to utilize a fourth machine learning model to generate an analysis of the results, and automatically cause an action to be performed based on the analysis of the results, where the action is associated with the cloud application and includes at least one of correcting an error in the cloud application, providing a recommendation to correct the error in the cloud application, or generating code to improve the cloud application.

According to some implementations, a method may include receiving, by a device, application information associated with a cloud application provided in a cloud computing environment, where the application information includes one or more of source code for the cloud application, metadata associated with the cloud application, training data, or defect data associated with the cloud application. The method may include utilizing, by the device, a first artificial intelligence model to generate test cases based on the application information, where each of the test cases including one or more of a test case identifier, test data, a test sequence, an expected result, an actual result, or status information. The method may include utilizing, by the device, a second artificial intelligence model to generate optimized test cases based on the test cases, and utilizing, by the device, a third artificial intelligence model to generate test classes based on the optimized test cases. The method may include executing, by the device, the test classes to generate results, and utilizing, by the device, a fourth artificial intelligence model to generate an analysis of the results, and one or more recommendations for the cloud application based on the analysis of the results. The method may include automatically causing, by the device, an action to be performed based on the analysis of the results or the one or more recommendations, where the action is associated with the cloud application.

DETAILED DESCRIPTION

The following detailed description of example implementations refers to the accompanying drawings. The same reference numbers in different drawings may identify the same or similar elements.

Cloud applications have several attributes that make them different than typical software applications. For example, cloud applications execute on virtualized hardware and a software stack that can be moved and replicated between physical machines as needed, share common physical resources with other cloud applications, are built to be highly scalable in real-time, and are predominately accessed using standard network protocols. Furthermore, cloud applications use hypertext markup language (HTML) and other web technologies for providing front-end and management user interfaces, provide application programming interfaces (APIs) for integration and management, consume third-party APIs for providing common services and functionality, and tend to use no structured query language (SQL) data stores.

These attributes make testing cloud applications very difficult and much different than testing typical software applications. For example, since cloud applications execute on hardware that is controlled by the cloud provider and is shared with other applications, testing of cloud applications requires testing performance and scalability in environments similar to the environments of the cloud applications. Since cloud applications usually share resources and infrastructure with other cloud applications, testing of cloud applications requires providing extra consideration to data privacy and access control issues. Furthermore, since cloud applications consume external APIs and services for providing functionality for the external APIs, testing of cloud applications requires testing of the external APIs and the services providing the functionality for the external APIs. Thus, testing of cloud applications consumes vast amounts of time, resources, and capital.

Some implementations described herein provide a testing platform that utilizes artificial intelligence (AI) to automatically test a cloud application and provide and/or implement recommendations for the cloud application based on results of testing the cloud application. For example, the testing platform may utilize a first AI model to generate test cases and test data based on application information associated with the cloud application, and may utilize a second AI model to generate optimized test cases and test data based on the test cases and the test data. The testing platform may utilize a third AI model to generate test classes based on the optimized test cases and test data, and may execute the test classes to generate results. The testing platform may utilize a fourth AI model to generate recommendations for the cloud application, based on the results, and may automatically cause the recommendations to be implemented.

Figure 1A:
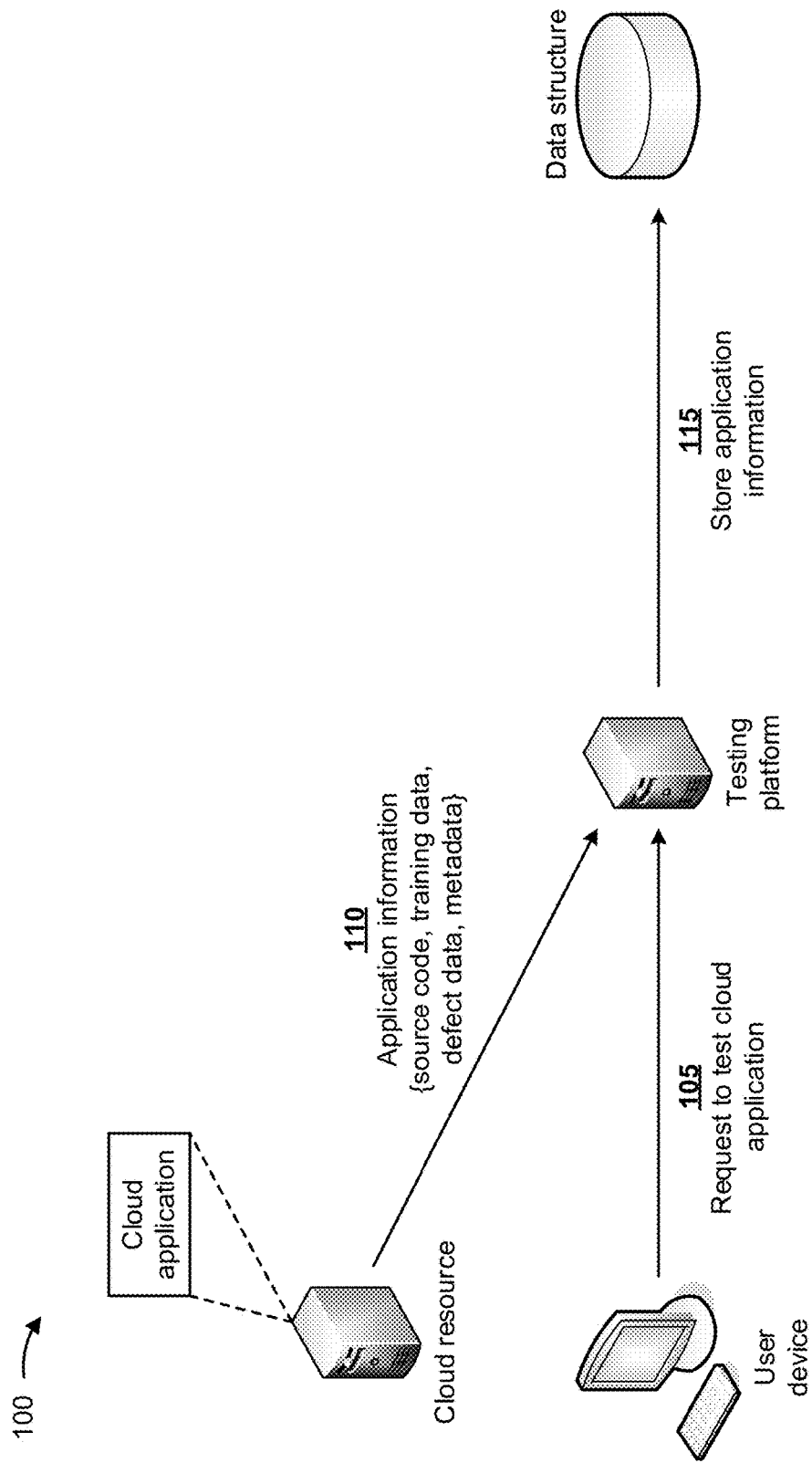
FIGS. 1A-1G are diagrams of an overview of an example implementation described herein.

FIGS. 1A-1G are diagrams of an overview of an example implementation 100 described herein. As shown in FIG. 1A, a user device and a cloud resource (e.g., a computing resource) may be associated with a testing platform. The cloud resource may be associated with a cloud application to be executed or executing in a cloud computing environment. As shown in FIG. 1A, and by reference number 105, a user of the user device may provide, to the testing platform, a request to test the cloud application, and the testing platform may receive the request. As further shown in FIG. 1A, and by reference number 110, based on the request, the testing platform may receive application information from the cloud resource. In some implementations, the user device may instruct the cloud resource to provide the application information to the testing platform. In some implementations, the testing platform may request the application information from the cloud resource based on the request to test the cloud application, and may receive the application information from the cloud resource.

In some implementations, the application information may include information associated with the cloud application. For example, the application information may include source code of the cloud application, training data associated with the cloud application (e.g., data to train an artificial intelligence model), defect data associated with the cloud application (e.g., data identifying defects in the cloud application), metadata associated with the cloud application, information about technical parameters of the cloud application, availability information associated with the cloud application, organization information relating to a structure of an organization (e.g., associated with the cloud application), and/or the like.

As further shown in FIG. 1A, and by reference number 115, the testing platform may store the application information in a data structure, such as a database, a table, a linked-list, a tree, and/or the like. In some implementations, the data structure may be provided in a memory associated with the testing platform. The testing platform may store the application information so that the testing platform may perform further processing on the application information, such as testing the cloud application based on the application information. In some implementations, the testing platform may provide security features, such as integration with vaults or secure data sources, to ensure secure distribution and storage of the application information.

Figure 1B:
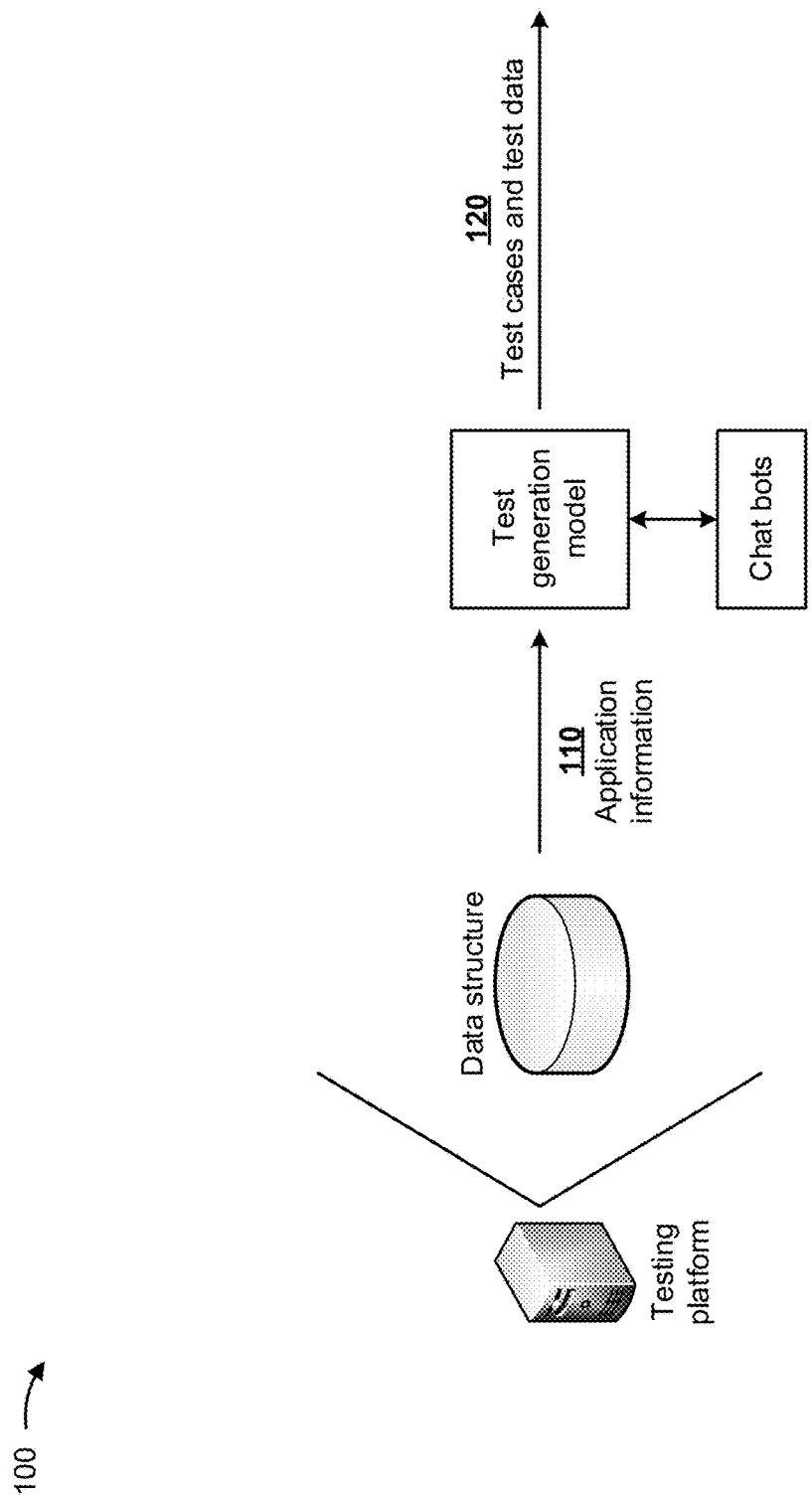

As shown in FIG. 1B, and as indicated by reference number 110, a first artificial intelligence (AI) model (e.g., a test generation model), provided by the testing platform, may retrieve or receive the application information from the data structure. In some implementations, the test generation model may include a machine learning model, such as a pattern analysis model, a predictive analysis model, a data mining model, and/or the like. In some implementations, the training data associated with the cloud application, and/or other training data received from other sources, may be provided to the test generation model in order to train the test generation model.

In some implementations, the test generation model may include a model (e.g., a pattern analysis model) for recognizing patterns and/or regularities in data, such as a model based on pattern matching, a model based on pattern recognition, and/or the like. For example, the pattern analysis model may apply pattern matching techniques to identify exact matches in an input with pre-existing patterns, and/or may apply pattern recognition techniques to provide a reasonable answer for all possible inputs and to perform most likely matching of the inputs, based on statistical variation. Pattern recognition may utilize different learning procedures, such as supervised learning, unsupervised learning, semi-supervised learning, and/or the like. Supervised learning assumes that a set of training data is provided and includes a set of instances that have been properly labeled with a correct output. Unsupervised learning assumes training data that is not labeled, or assumes that no training data exists, and attempts to find inherent patterns in the data that can then be used to determine a correct output value for new data instances. Semi-supervised learning uses a combination of labeled and unlabeled data (e.g., a small set of labeled data combined with a large amount of unlabeled data). The pattern analysis model may determine techniques for pattern recognition based on a type of label output, based on whether learning is supervised or unsupervised, and/or the like.

In some implementations, the test generation model may include a model (e.g., a predictive analysis model) for performing predictive analytics, predictive modeling, and/or the like. For example, predictive analytics may utilize data (e.g., the application information), algorithms, and machine learning techniques to identify a likelihood of future events based on historical data. Predictive analytics may include extracting particular information from data (e.g., the application information) and using the extracted information to predict trends and/or patterns. Predictive analytics relies on capturing relationships between explanatory variables and predicted variables from past occurrences, and then utilizing the captured relationships to predict an unknown outcome.

In some implementations, the test generation model may include a model (e.g., a data mining model) for extracting particular information from a data set (e.g., the application information) and transforming the extracted information into an understandable structure for further use (e.g., test cases and/or test data). Data mining may include anomaly detection (e.g., outlier, change, and/or deviation detection) to identify unusual data records of interest or data errors that require further investigation, association rule learning (e.g., dependency modelling) to search for relationships between variables, clustering to discover groups and/or structures in data that are similar without using known structures in the data, classification to generalize known structure to apply to new data, regression to identify a function that models the data with the least error, summarization to provide a more compact representation of the data set, including visualization and report generation, and/or the like.

In some implementations, the testing platform may process the application information using natural language processing. In this case, the test generation model may include or be associated with a natural language processing application that recognizes, parses, and/or interprets the application information. Natural language processing is a field of computer science, artificial intelligence, and/or computational linguistics concerned with the interactions between computers and human (natural) languages and, in some cases, may be particularly concerned with programming computers to fruitfully process large natural language corpora.

As further shown in FIG. 1B, and by reference number 120, the test generation model may generate test cases and test data, based on the application information, for testing the cloud application. In some implementations, each test case may include a series of tests to perform on the cloud application in order to test different aspects of the cloud application. Each test case may include a format that includes a test case identifier, test data for the test case, a test sequence for the test case, an expected result for the test case, an actual result for the test case, and/or status information associated with the test case (e.g., a pass/fail status). In some implementations, the test data may include data to be utilized by the test cases when testing the different aspects of the cloud application.

In some implementations, the test generation model may perform a pattern analysis and a predictive analysis on the application information to generate test cases for the cloud application. In some implementations, the test generation model may utilize a predefined set of training examples to facilitate generation of the test cases for the cloud application based on the application information.

In some implementations, the test generation model may perform a static code analysis of the cloud application (e.g., analysis of the cloud application without actually executing the cloud application), and may utilize results of the static code analysis, the metadata associated with the cloud application, patterns in the test data, and/or the like to generate the test cases. In some implementations, the test generation model may utilize control flow information associated with the cloud application (e.g., derived from the source code of the cloud application) to identify a set of paths to be covered, and may generate appropriate test cases for the identified set of paths.

In some implementations, the test generation model may utilize data mining to identify valid, novel, potentially useful, understandable, and/or the like patterns in the application information and/or data generated by the cloud application. In such implementations, the test generation model may generate the test data based on the identified patterns. In some implementations, the test generation model may utilize the metadata associated with the cloud application to identify different branches of the cloud application and/or to analyze a structure of the cloud application.

In some implementations, the test generation model may utilize the static code analysis of the cloud application to generate the test cases based on different code conditions and validations associated with the cloud application. In such implementations, the test generation model may identify testing gaps and/or wasteful or ineffective tests, and may provide a list of recommended tests to execute in order to minimize time associated with testing the cloud application.

In some implementations, the test generation model may utilize the defect data associated with the cloud application to analyze a test scenario and/or an expected result and actual result of the test scenario, and to identify the test data.

As further shown in FIG. 1B, the test generation model may interact with one or more chat bots (e.g., computer programs that conduct conversations via auditory or textual methods) when utilizing the application information to generate the test cases and the test data. In such implementations, the chat bots may provide mechanisms for user input to and interaction with the test generation model. For example, the chat bots may guide the process from receiving the application information to generating the test cases and the test data for testing the cloud application. In some implementations, each chat bot may include an Artificial Intelligence Virtual Assistant (AIVA) chat bot, a JavaScript (JS) chat bot, a node JS (or Node.js, an open source JavaScript run-time environment) chat bot, a Hubot chat bot, and/or the like.

Figure 1C:
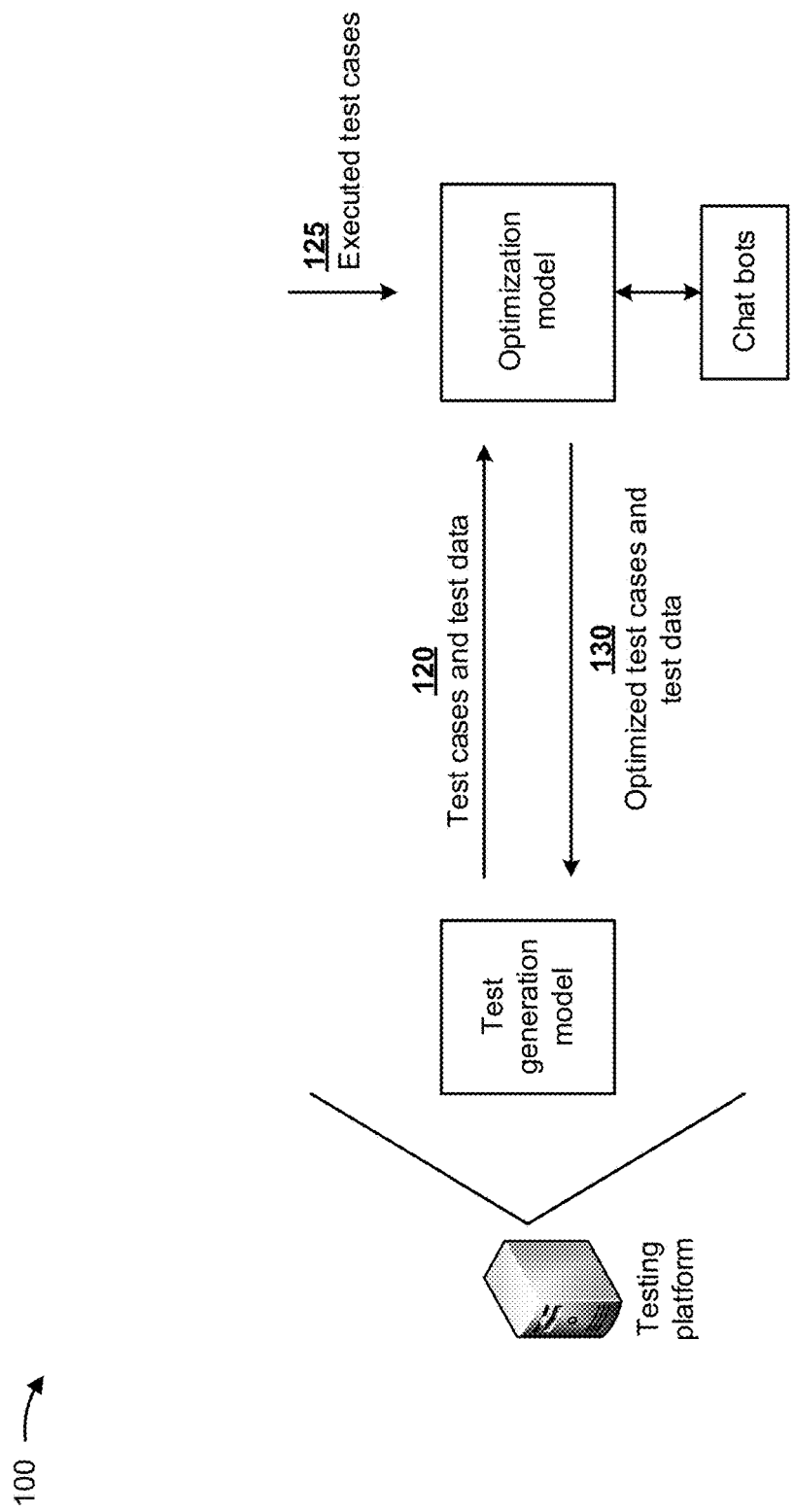

As shown in FIG. 1C, and by reference number 120, the test generation model, of the testing platform, may provide the test cases and the test data to a second AI model (e.g., an optimization model) provided by the testing platform. As further shown in FIG. 1C, and by reference number 125, the optimization model may receive, from another source, information associated with executed test cases. In some implementations, the optimization model may include a machine learning model, such as a regression analysis model, a cluster analysis model, and/or the like. In some implementations, training data (e.g., the information associated with executed test cases) may be provided to the optimization model in order to train the optimization model. In some implementations, the optimization model may include a model (e.g., a regression analysis model) for estimating relationships among variables (e.g., associated with the test cases and/or test data).

Regression analysis may include a variety of techniques for modeling and analyzing several variables, when a focus is on a relationship between a dependent variable and one or more independent variables (e.g., predictors). For example, regression analysis may help determine how the typical value of a dependent variable (or a criterion variable) changes when any one of the independent variables is varied, while the other independent variables are held fixed. Regression analysis techniques may include parametric methods (e.g., where a regression function is defined in terms of a finite number of unknown parameters that are estimated from the data) such as linear regression and/or ordinary least squares regression, and/or may include non-parametric methods (e.g., that allow the regression function to lie in a specified set of functions).

In some implementations, the optimization model may include a model (e.g., a cluster analysis model) for grouping a set of objects in such a way that objects in a same group (i.e., a cluster) are more similar to each other than to objects in other groups (i.e., other clusters). Cluster analysis may be performed by applying one or more of a variety of different techniques that apply different cluster models. Such cluster models may define clusters in different ways. The cluster models may include connectivity models (e.g., hierarchical clustering, which builds models based on distance connectivity), centroid models (e.g., a k-means technique, which represents each cluster by a single mean vector), distribution models (e.g., in which clusters are modeled using statistical distributions), density models (e.g., defining clusters as connected dense regions in the data space), subspace models (e.g., co-clustering), group models, graph-based models, neural models, and/or the like. A cluster algorithm may employ hard clustering, in which each object either belongs to a cluster or does not belong to a cluster, or may employ soft clustering, in which each object belongs to each cluster to a certain degree (e.g., a particular likelihood of belonging to the cluster). Additionally, clusters may be strictly partitioned, hierarchical, overlapping, and/or the like.

As further shown in FIG. 1C, and by reference number 130, the optimization model may generate optimized test cases and optimized test data (e.g., indicating an optimum time to execute the test cases) based on the test cases and the test data (e.g., based on usage of network resources by the test cases), and may provide the optimized test cases and the optimized test data to the test generation model. In some implementations, the optimized test cases may include a portion of the test cases, and the optimized test data may include a portion of the test data.

In some implementations, the optimization model may utilize the regression analysis model to perform a periodic cleanup of the test cases. For example, the optimization model may analyze the tests cases for usability under one or more different scenarios. If particular test cases for particular scenarios are not usable, the optimization model may remove the particular test cases from the test cases. The periodic cleanup may ensure robustness of the remaining test cases.

In some implementations, the optimization model may utilize the cluster analysis model to identify redundant test data, and to identify duplicate and/or similar test cases and unique test cases. In such implementations, the optimization model may remove the redundant test data from the test data to generate the optimized test data, and may remove the duplicate and/or similar test cases from the test cases. Such implementations may reduce a risk of test case duplication, may increase the quality of the testing platform, and may reduce execution times associated with the test cases.

In some implementations, the optimization model may select a representative set of test cases from the test cases when the representative set of test cases provides the same or similar test coverage as all of the test cases. Such implementations may provide fewer test cases with the same or similar coverage, which may reduce execution times associated with the test cases, may reduce resource utilization for executing the test cases, may reduce costs associated with executing the test cases, and may maintain the same quality as execution of all of the test cases.

In some implementations, the optimization model may periodically screen the test cases in order to ensure accurate and efficient test cases. Such periodic screening may help identify and eliminate problems and issues in the test cases, which would otherwise reduce an effectiveness of the test cases.

As further shown in FIG. 1C, the optimization model may interact with one or more chat bots when generating the optimized test cases and the optimized test data. In such implementations, the chat bots may provide mechanisms for user input to and interaction with the optimization model. For example, the chat bots may guide the process for receiving the test cases and the test data, and generating the optimized test cases and the optimized test data.

Figure 1D:
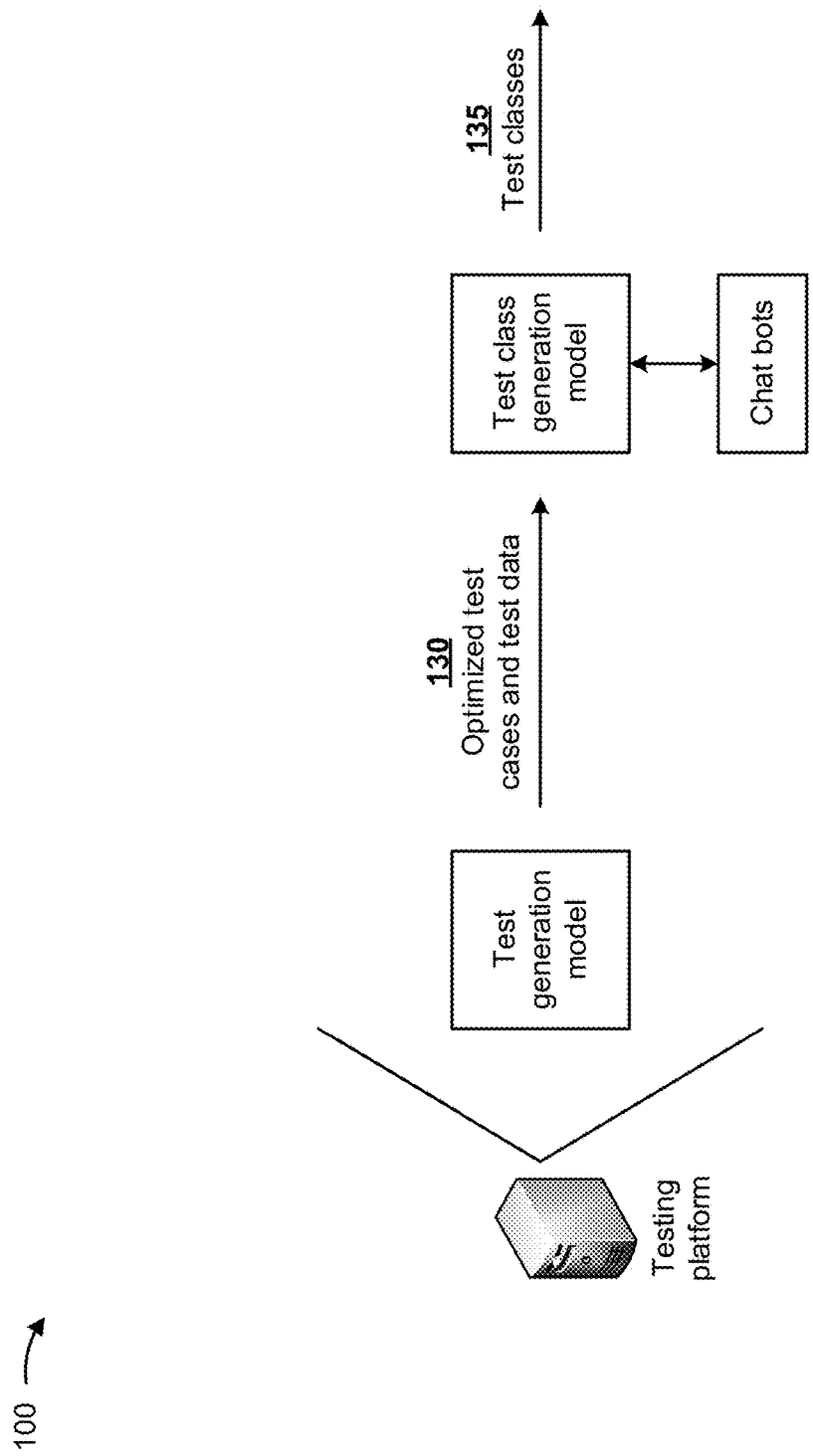

As shown in FIG. 1D, and by reference number 130, the test generation model, of the testing platform, may provide the optimized test cases and the optimized test data to a third AI model (e.g., a test class generation model) provided by the testing platform. In some implementations, the test class generation model may include a machine learning model, such as a cluster analysis model, a predictive analysis model, and/or the like. In some implementations, training data, received from other sources, may be provided to the test class generation model in order to train the test class generation model.

As further shown in FIG. 1D, and by reference number 135, the test class generation model may generate test classes based on the optimized test cases and the optimized test data. In some implementations, each test class may include one or more test cases and test data associated with the one or more test cases. In some implementations, each test class may include a quantity of test cases such that, if the test class is applied to the cloud application under test, then the testing platform may collect enough information to precisely determine whether the cloud application is operating correctly or incorrectly according to some specification.

In some implementations, the test classes may include a hierarchy of testing difficulty (e.g., a first test class will include a lowest testing difficulty, a second test class will include a higher testing difficulty than the first test class but a lower testing difficulty than a third test class, etc.). In such implementations, based on an amount of test cases required to construct a test class, the hierarchy of testing difficulty may include a first test class (e.g., that includes a quantity of test cases to ensure determination of whether the cloud application is operating correctly or incorrectly), a second test class (e.g., that includes the first test class and an additional quantity of test cases), a third test class (e.g., that includes the second test class and another additional quantity of test cases), and/or the like.

In some implementations, the test class generation model may utilize the optimized test cases, the optimized test data, the metadata associated with the cloud application, and the results of the static code analysis of the cloud application to generate the test classes. In some implementations, the test class generation model may utilize the cluster analysis model to organize the generated test classes based on different features of the cloud application. Such implementations may aid in execution of specific test classes and/or specific test cases in an optimized manner. In some implementations, the test class generation model may utilize the predictive analysis model with outputs of the optimized test cases in order to logically test the test classes.

As further shown in FIG. 1D, the test class generation model may interact with one or more chat bots when generating the test classes based on the optimized test cases and the optimized test data. In such implementations, the chat bots may provide mechanisms for user input to and interaction with the test class generation model. For example, the chat bots may guide the process for receiving the optimized test cases and the optimized test data, and generating the test classes.

Figure 1E:
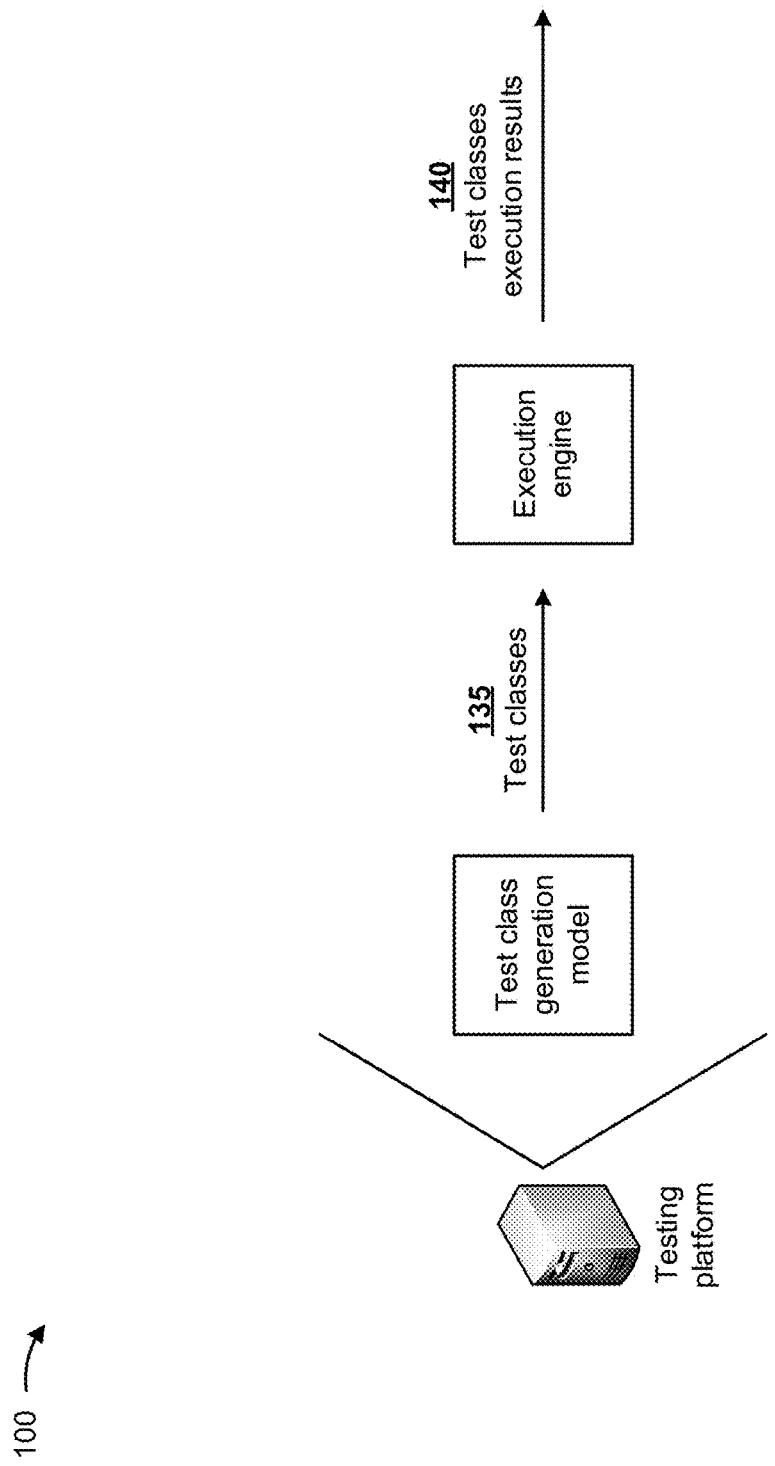

As shown in FIG. 1E, and by reference number 135, the test class generation model of the testing platform may provide the test classes to an execution engine of the testing platform. The execution engine may receive the test classes, and may execute the test classes. As further shown in FIG. 1E, and by reference number 140, based on executing the test classes, the execution engine may generate test classes execution results. In some implementations, the test classes execution results may include information indicating whether execution of each test class resulted in an expected result (e.g., a passing result) or an unexpected result (e.g., a failing result), information indicating which portion or portions of the cloud application were tested by each test class, information indicating whether execution of each test case resulted in an expected result or an unexpected result, and/or the like.

Figure 1F:
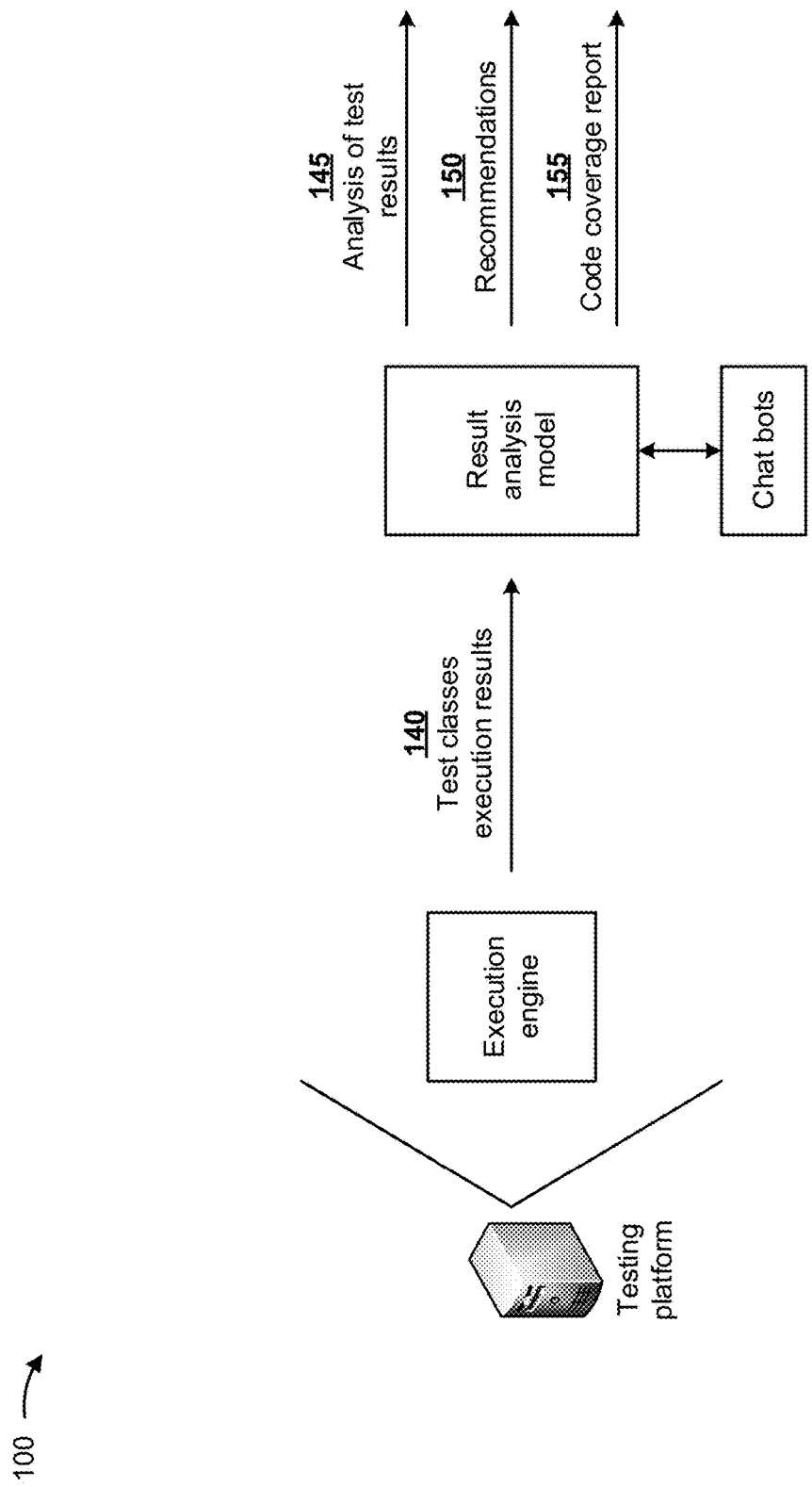

As shown in FIG. 1F, and by reference number 140, the execution engine, of the testing platform, may provide the test classes execution results to a fourth AI model (e.g., a result analysis model) provided by the testing platform. In some implementations, the result analysis model may include a machine learning model, such as a cluster analysis model, a predictive analysis model, and/or the like. In some implementations, training data, received from other sources, may be provided to the result analysis model in order to train the result analysis model.

As further shown in FIG. 1F, and by reference number 145, the result analysis model may analyze the test classes execution results, and may generate an analysis of the test classes execution results. In some implementations, the analysis of the test classes execution results may include information identifying one or more portions of the cloud application that include defects or bugs, information identifying criticality levels (e.g., "low" for minor portions of the cloud application, "medium" for somewhat important portions of the cloud application, and "high" for critical portions of the cloud application) associated with the defects, information identifying one or more portions of the cloud application that are functioning properly, information identifying criticality levels for the properly functioning portions of the cloud application, and/or the like.

As further shown in FIG. 1F, and by reference number 150, the result analysis model may generate one or more recommendations based on the analysis of the test classes execution results. In some implementations, the one or more recommendations may include information indicating next best actions for addressing portions of the cloud application with defects, information indicating how defects, similar to the defects in the portions of the cloud application, were previously corrected, information indicating how the cloud application can be improved based on prior improvements made to similar cloud applications, and/or the like. In some implementations, the result analysis model may compare expected results of the test classes and the test classes execution results in order to aid in generation of the one or more recommendations.

As further shown in FIG. 1F, and by reference number 155, the result analysis model may generate a code coverage report based on the analysis of the test classes execution results. In some implementations, the code coverage report may include a report indicating a degree (e.g., a percentage) to which the source code of the cloud application is tested and certified (e.g., if there are no defects) when the test classes are executed by the execution engine of the testing platform. For example, if the code coverage report indicates that the source code of the cloud application includes a high test coverage (e.g., measured as a percentage), this may indicate that more of the source code of the cloud application was executed during testing and that the cloud application has a lower chance of containing undetected defects compared to a cloud application with a low test coverage. In some implementations, many different metrics may be used to calculate the code coverage of the cloud application, such as a percentage of subroutines of the cloud application called during execution of the test classes, a percentage of statements called during execution of the test classes, and/or the like.

Figure 1G:
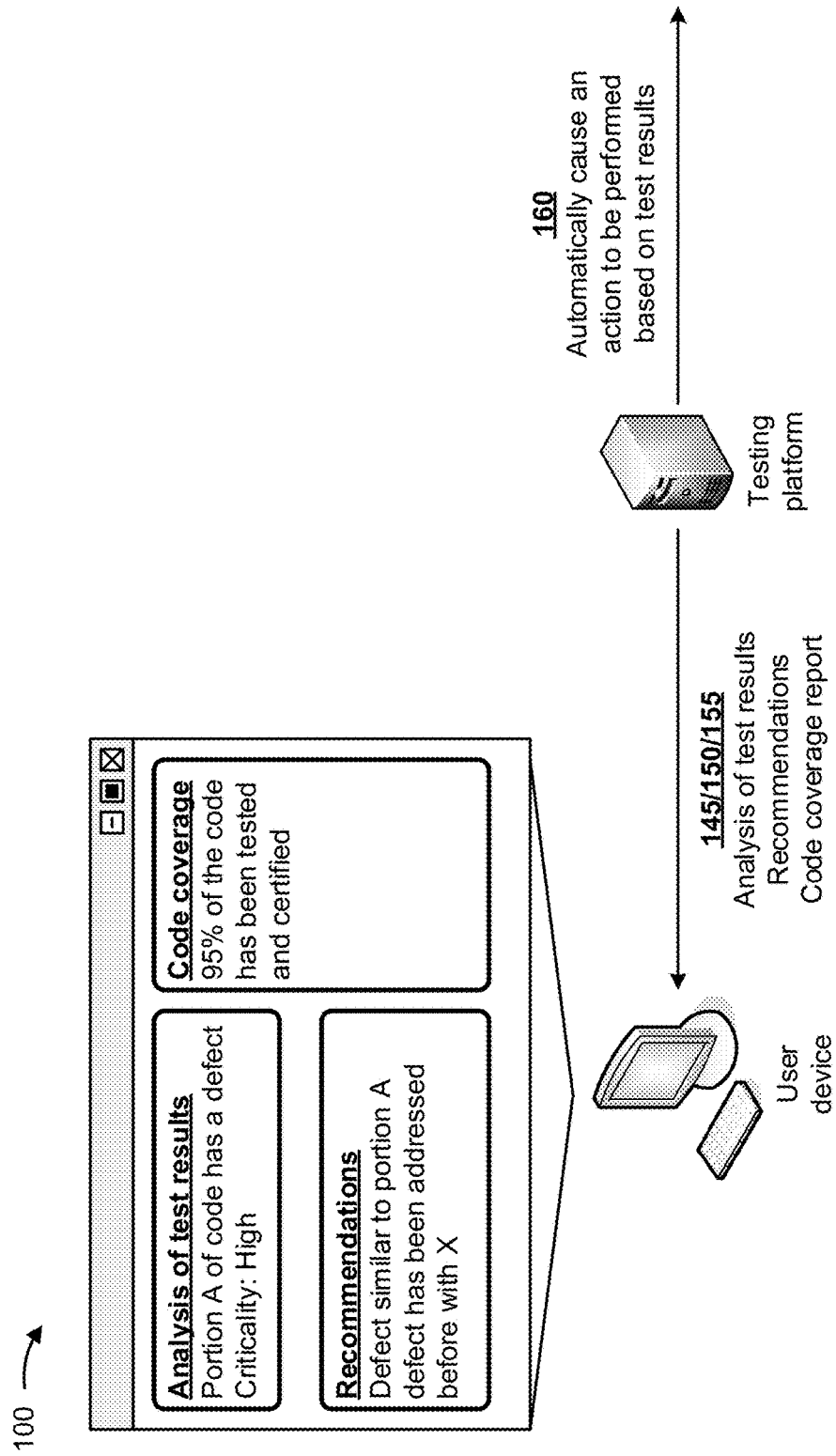

As shown in FIG. 1G, and by reference numbers 145, 150, and 155, the testing platform may provide the analysis of the test results, the one or more recommendations, and/or the code coverage report to the user device, and the user device may provide the analysis of the test results, the one or more recommendations, and/or the code coverage report for display to a user of the user device. For example, the user device may display the analysis of the test results (e.g., indicating that portion A of the source code of the cloud application has a defect and that portion A has a high criticality to the functioning of the cloud application), the one or more recommendations (e.g., indicating that the defect in portion A of the source code is similar to a defect that has been addressed before with X), and the code coverage report (e.g., indicating that 95% of the source code of the cloud application has been tested and certified). In some implementations, the user of the user device may utilize the analysis of the test results, the one or more recommendations, and/or the code coverage report to perform an action on the cloud application. For example, the user may attempt to correct the defect in portion A of the source code of the cloud application by rewriting portion A of the source code, deleting portion A of the source code, correcting portion A of the source code, and/or the like.

As further shown in FIG. 1G, and by reference number 160, the testing platform may automatically perform an action, or cause an action to be performed, based on the analysis of the test results, the one or more recommendations, and/or the code coverage report. In some implementations, the action may include automatically correcting any defects in the source code of the cloud application, automatically deleting portions of the source code with defects, automatically replacing portions of the source code with defects, automatically notifying a developer of the cloud application about any defects in the source code, and/or the like. For example, the testing platform may replace the entire source code, replace a portion of the source code, and/or the like. As another example, the testing platform may add new code to enhance the performance of the cloud application, such as to increase an execution speed associated with the cloud application. In another example, the testing platform may add new code to work around a particular defect in the source code.

In some implementations, the testing platform may provide (e.g., for display on the user device) a proposed addition to the source code, a proposed modification of the source code, a proposed deletion of a portion of the source code, and/or the like, and may provide a user (e.g., a developer of the source code) with an option to approve or reject the proposed addition, modification, or deletion. For example, the testing platform may propose multiple additions, modifications, and/or deletions to the source code, and may provide the user with an option to accept all additions, modifications, or deletions, to reject all additions, modifications, or deletions, or to select individual additions, modifications, or deletions to accept and/or reject. In some implementations, the testing platform may store (e.g., in a data structure), aggregate, and/or process the recommendations, the acceptances or rejections of the recommendations, and/or the like. For example, the testing platform may perform analysis of the recommendations, acceptances or rejections, and/or the like, and may modify the recommendations, may provide comprehensive reports that represent, illustrate, compare, etc. the proposed additions, modifications, or deletions, and/or the like based on the analysis.

In this way, several different stages of the cloud application testing process are automated using AI, which may remove human subjectivity and waste from the process, and which may improve speed and efficiency of the process and conserve computing resources (e.g., processors, memory, and/or the like). Furthermore, implementations described herein use a rigorous, computerized process to perform tasks or roles that were not previously performed or were previously performed using subjective human intuition or input. These roles may include identifying test cases and test data for a cloud application, determining test classes based on the test cases and test data, analyzing results of execution of the test classes, recommending next best actions based on the analysis of the results, and/or the like. Finally, automating the testing of cloud applications conserves computing resources (e.g., processors, memory, and/or the like) that would otherwise be wasted in unsuccessfully attempting to manually test cloud applications.

As indicated above, FIGS. 1A-1G are provided merely as examples. Other examples are possible and may differ from what was described with regard to FIGS. 1A-1G.

Figure 2:
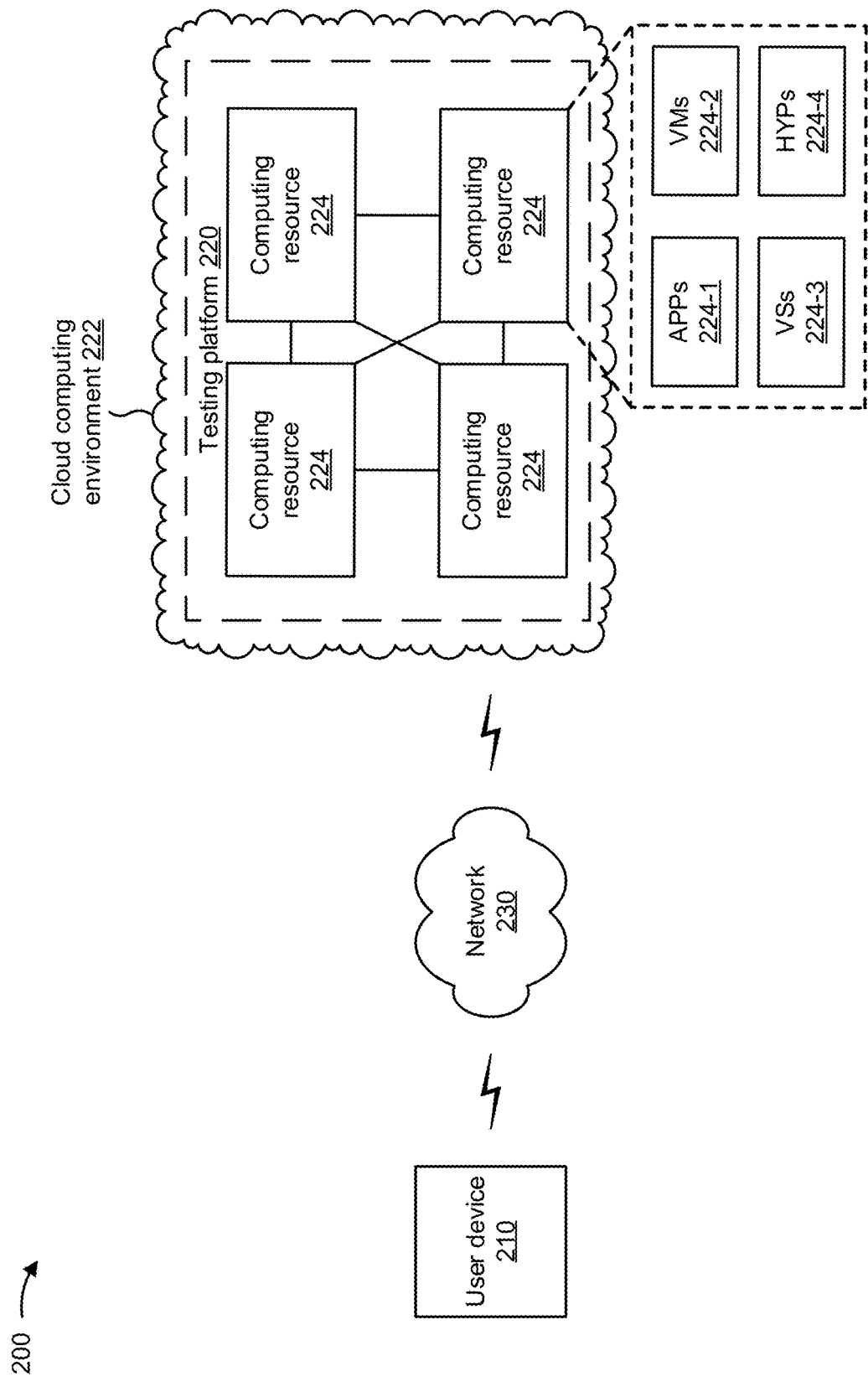
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a testing platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to testing platform 220.

Testing platform 220 includes one or more devices that utilizes artificial intelligence to automatically test a cloud application and provide and/or implement recommendations for the cloud application based on results of testing the cloud application. In some implementations, testing platform 220 may be designed to be modular such that certain software components may be swapped in or out depending on a particular need. As such, testing platform 220 may be easily and/or quickly reconfigured for different uses. In some implementations, testing platform 220 may receive information from and/or transmit information to one or more user devices 210.

In some implementations, as shown, testing platform 220 may be hosted in a cloud computing environment 222. Notably, while implementations described herein describe testing platform 220 as being hosted in cloud computing environment 222, in some implementations, testing platform 220 may not be cloud-based (i.e., may be implemented outside of a cloud computing environment) or may be partially cloud-based.

Cloud computing environment 222 includes an environment that hosts testing platform 220. Cloud computing environment 222 may provide computation, software, data access, storage, etc. services that do not require end-user knowledge of a physical location and configuration of system(s) and/or device(s) that hosts testing platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host testing platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with testing platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of testing platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
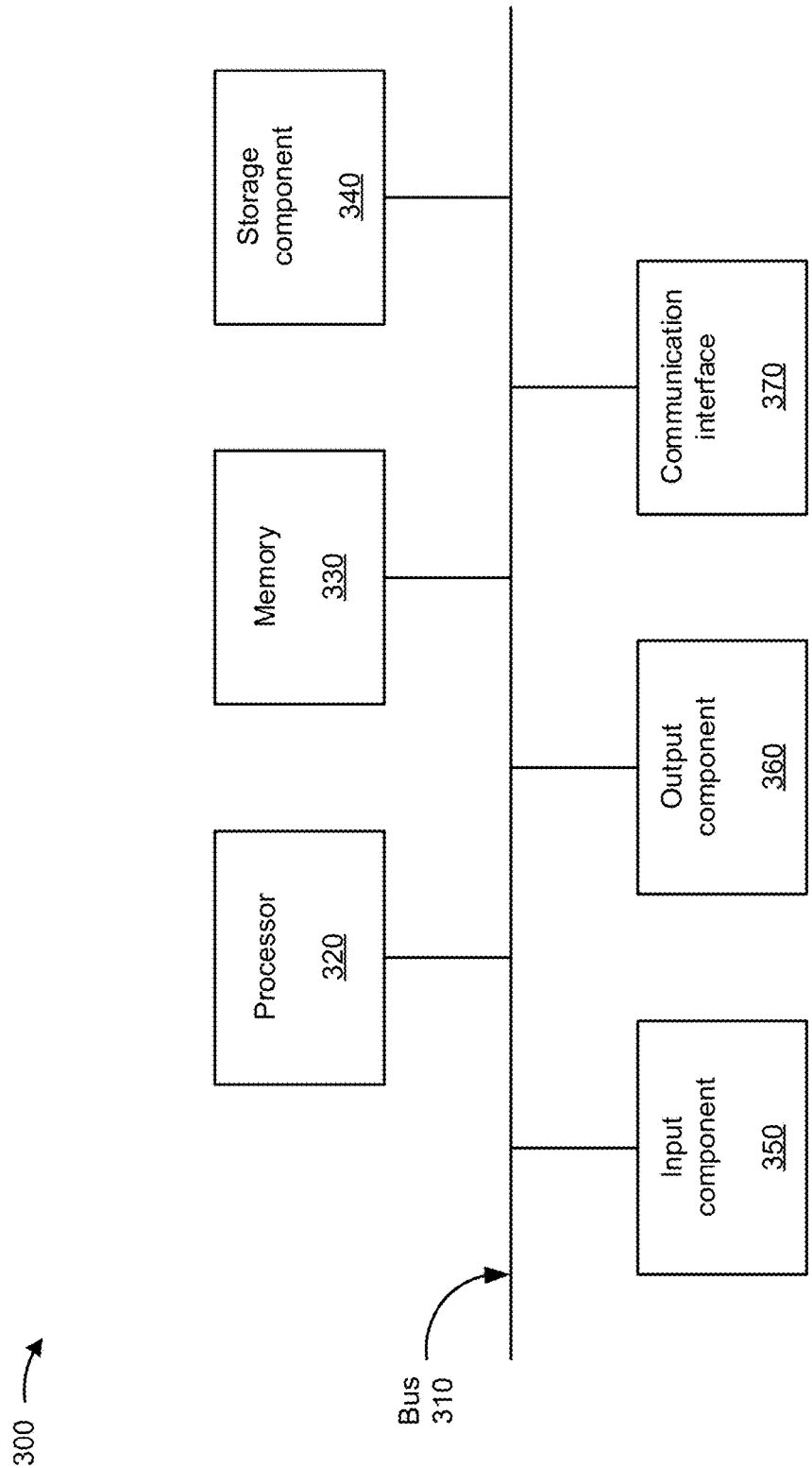
FIG. 3 is a diagram of example components of one or more devices of FIG. 2.

FIG. 3 is a diagram of example components of a device 300. Device 300 may correspond to user device 210, testing platform 220, and/or computing resource 224. In some implementations, user device 210, testing platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
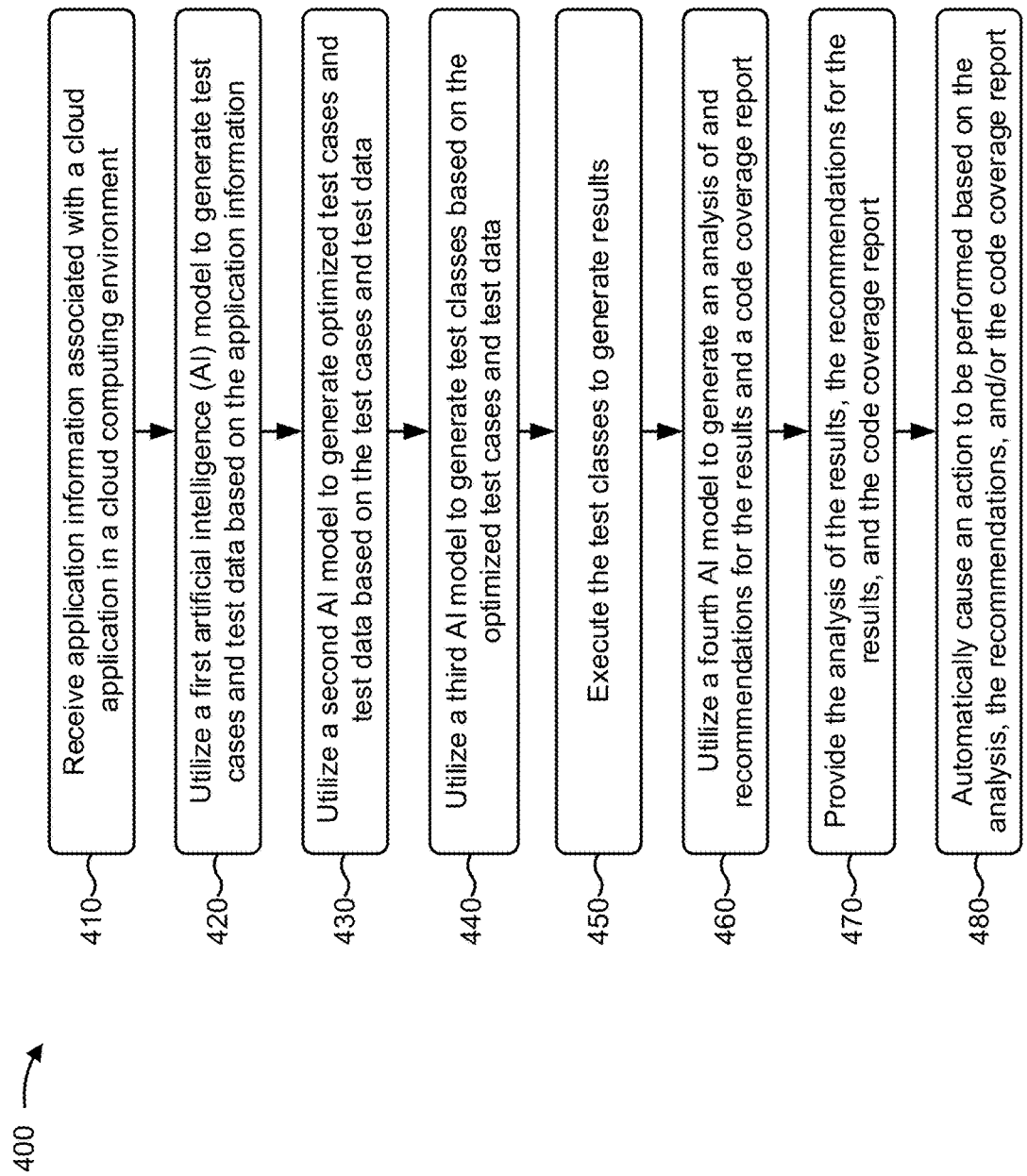
FIG. 4 is a flow chart of an example process for utilizing artificial intelligence to test cloud applications.

FIG. 4 is a flow chart of an example process 400 for utilizing artificial intelligence to test cloud applications. In some implementations, one or more process blocks of FIG. 4 may be performed by testing platform 220. In some implementations, one or more process blocks of FIG. 4 may be performed by another device or a group of devices separate from or including testing platform 220, such as user device 210.

As shown in FIG. 4, process 400 may include receiving application information associated with a cloud application in a cloud computing environment (block 410). For example, testing platform 220 may receive (e.g., using computing resource 224, processor 320, communication interface 370, and/or the like) application information associated with a cloud application in a cloud computing environment similar to cloud computing environment 222. In some implementations, a user of user device 210 may provide, to testing platform 220, a request to test a cloud application, and testing platform 220 may receive the request. Testing platform 220 may receive application information from a cloud resource (e.g., similar to computing resource 224). In some implementations, user device 210 may instruct the cloud resource to provide the application information to testing platform 220. In some implementations, testing platform 220 may request the application information from the cloud resource based on the request to test the cloud application, and may receive the application information from the cloud resource.

In some implementations, the application information may include information associated with the cloud application. For example, the application information may include source code of the cloud application, training data associated with the cloud application, defect data associated with the cloud application, metadata associated with the cloud application, information about technical parameters of the cloud application, availability information associated with the cloud application, and/or the like. Testing platform 220 store the application information in a data structure.

In this way, testing platform 220 may receive the application information associated with the cloud application in the cloud computing environment.

As further shown in FIG. 4, process 400 may include utilizing a first artificial intelligence model to generate test cases and test data based on the application information (block 420). For example, testing platform 220 may utilize (e.g., using computing resource 224, processor 320, and/or the like) a first artificial intelligence model to generate test cases and test data based on the application information. In some implementations, a first AI model (e.g., a test generation model), provided by testing platform 220, may retrieve or receive the application information from the data structure. In some implementations, the test generation model may include a machine learning model, such as a pattern analysis model, a predictive analysis model, a data mining model, and/or the like. In some implementations, the training data associated with the cloud application, and/or other training data received from other sources, may be provided to the test generation model in order to train the test generation model.

In some implementations, testing platform 220 may process the application information using natural language processing. In this case, the test generation model may include or be associated with a natural language processing application that recognizes, parses, and/or interprets the application information.

The test generation model may generate test cases and test data, based on the application information, for testing the cloud application. In some implementations, each test case may include a series of tests to perform on the cloud application in order to test different aspects of the cloud application. Each test case may include a format that includes a test case identifier, test data for the test case, a test sequence for the test case, an expected result for the test case, an actual result for the test case, and/or status information associated with the test case. In some implementations, the test data may include data to be utilized by the test cases when testing the different aspects of the cloud application.

In some implementations, the test generation model may perform a pattern analysis and a predictive analysis on the application information to generate test cases for the cloud application. In some implementations, the test generation model may utilize a predefined set of training examples to facilitate generation of the test cases for the cloud application based on the application information.

In some implementations, the test generation model may perform a static code analysis of the cloud application, and may utilize results of the static code analysis, the metadata associated with the cloud application, patterns in the test data, and/or the like to generate the test cases. In some implementations, the test generation model may utilize control flow information associated with the cloud application to identify a set of paths to be covered, and may generate appropriate test cases for the identified set of paths.

In some implementations, the test generation model may utilize data mining to identify valid, novel, potentially useful, understandable, and/or the like patterns in the application information and/or data generated by the cloud application. In such implementations, the test generation model may generate the test data based on the identified patterns. In some implementations, the test generation model may utilize the metadata associated with the cloud application to identify different branches of the cloud application and/or to analyze a structure of the cloud application.

In some implementations, the test generation model may utilize the static code analysis of the cloud application to generate the test cases based on different code conditions and validations associated with the cloud application. In such implementations, the test generation model may identify testing gaps and/or wasteful or ineffective tests, and may provide a list of recommended tests to execute in order to minimize time associated with testing the cloud application. In some implementations, the test generation model may utilize the defect data associated with the cloud application to analyze a test scenario and/or an expected result and actual result of the test scenario, and to identify the test data.

In this way, testing platform 220 may utilize the first artificial intelligence model to generate the test cases and the test data based on the application information.

As further shown in FIG. 4, process 400 may include utilizing a second artificial intelligence model to generate optimized test cases and test data based on the test cases and the test data (block 430). For example, testing platform 220 may utilize (e.g., using computing resource 224, processor 320, and/or the like) a second artificial intelligence model to generate optimized test cases and test data based on the test cases and the test data. In some implementations, the test generation model, of testing platform 220, may provide the test cases and the test data to a second AI model (e.g., an optimization model) provided by testing platform 220. The optimization model may receive, from another source, information associated with executed test cases. In some implementations, the optimization model may include a machine learning model, such as a regression analysis model, a cluster analysis model, and/or the like. In some implementations, training data may be provided to the optimization model in order to train the optimization model.

In some implementations, the optimization model may generate optimized test cases and optimized test data based on the test cases and the test data, and may provide the optimized test cases and the optimized test data to the test generation model. In some implementations, the optimized test cases may include a portion of the test cases, and the optimized test data may include a portion of the test data.

In some implementations, the optimization model may utilize the regression analysis model to perform a periodic cleanup of the test cases. For example, the optimization model may analyze the tests cases for usability under one or more different scenarios. If particular test cases for particular scenarios are not usable, the optimization model may remove the particular test cases from the test cases.

In some implementations, the optimization model may utilize the cluster analysis model to identify redundant test data, and to identify duplicate and/or similar test cases and unique test cases. In such implementations, the optimization model may remove the redundant test data from the test data to generate the optimized test data, and may remove the duplicate and/or similar test cases from the test cases.

In some implementations, the optimization model may select a representative set of test cases from the test cases when the representative set of test cases provides the same or similar test coverage as all of the test cases. Such implementations may provide less test cases with the same or similar coverage, which may reduce execution times associated with the test cases, may reduce resource utilization for executing the test cases, may reduce costs associated with executing the test cases, and may maintain the same quality as execution of all of the test cases.

In some implementations, the optimization model may periodically screen the test cases in order to ensure accurate and efficient test cases. Such periodic screening may help identify and eliminate problems and issues in the test cases, which would otherwise reduce an effectiveness of the test cases.

In this way, testing platform 220 may utilize the second artificial intelligence model to generate the optimized test cases and test data based on the test cases and the test data.

As further shown in FIG. 4, process 400 may include utilizing a third artificial intelligence model to generate test classes based on the optimized test cases and test data (block 440). For example, testing platform 220 may utilize (e.g., using computing resource 224, processor 320, and/or the like) a third artificial intelligence model to generate test classes based on the optimized test cases and test data. In some implementations, the test generation model, of testing platform 220, may provide the optimized test cases and the optimized test data to a third AI model (e.g., a test class generation model) provided by testing platform 220. In some implementations, the test class generation model may include a machine learning model, such as a cluster analysis model, a predictive analysis model, and/or the like. In some implementations, training data, received from other sources, may be provided to the test class generation model in order to train the test class generation model.

In some implementations, the test class generation model may generate test classes based on the optimized test cases and the optimized test data. In some implementations, each test class may include one or more test cases and test data associated with the one or more test cases. In some implementations, each test class may include a quantity test cases such that, if the test class is applied to the cloud application under test, then testing platform 220 may collect enough information to precisely determine whether the cloud application is operating correctly or incorrectly according to some specification.

In some implementations, the test classes may include a hierarchy of testing difficulty. In such implementations, based on an amount of test cases required to construct a test class, the hierarchy of testing difficulty may include a first test class (e.g., that includes a quantity of test cases to ensure determination of whether the cloud application is operating correctly or incorrectly), a second test class (e.g., that includes the first test class and an additional quantity of test cases), a third test class (e.g., that includes the second test class and another additional quantity of test cases), and/or the like.

In some implementations, the test class generation model may utilize the optimized test cases, the optimized test data, the metadata associated with the cloud application, and the results of the static code analysis of the cloud application to generate the test classes. In some implementations, the test class generation model may utilize the cluster analysis model to organize the generated test classes based on different features of the cloud application.

In this way, testing platform 220 may utilize the third artificial intelligence model to generate the test classes based on the optimized test cases and test data.

As further shown in FIG. 4, process 400 may include executing the test classes to generate results (block 450). For example, testing platform 220 may execute (e.g., using computing resource 224, processor 320, and/or the like) the test classes to generate results. In some implementations, the test class generation model of testing platform 220 may provide the test classes to an execution engine of testing platform 220. The execution engine may receive the test classes, and may execute the test classes. In some implementations, based on executing the test classes, the execution engine may generate test classes execution results. In some implementations, the test classes execution results may include information indicating whether execution of each test class resulted in an expected result (e.g., a passing result) or an unexpected result (e.g., a failing result), information indicating which portion or portions of the cloud application were tested by each test class, information indicating whether execution of each test case resulted in an expected result or an unexpected result, and/or the like.

In this way, testing platform 220 may execute the test classes to generate the results.

As further shown in FIG. 4, process 400 may include utilizing a fourth artificial intelligence model to generate an analysis of and recommendations for the results, and a code coverage report (block 460). For example, testing platform 220 may utilize (e.g., using computing resource 224, processor 320, and/or the like) a fourth artificial intelligence model to generate an analysis of and recommendations for the results, and a code coverage report. In some implementations, the execution engine, of testing platform 220, may provide the test classes execution results to a fourth AI model (e.g., a result analysis model) provided by testing platform 220. In some implementations, the result analysis model may include a machine learning model, such as a cluster analysis model, a predictive analysis model, and/or the like. In some implementations, training data, received from other sources, may be provided to the result analysis model in order to train the result analysis model.

In some implementations, the result analysis model may analyze the test classes execution results, and may generate an analysis of the test classes execution results. In some implementations, the analysis of the test classes execution results may include information identifying one or more portions of the cloud application that include defects or bugs, information identifying criticality levels associated with the defects, information identifying one or more portions of the cloud application that are functioning properly, information identifying criticality levels for the properly functioning portions of the cloud application, and/or the like.

In some implementations, the result analysis model may generate one or more recommendations based on the analysis of the test classes execution results. In some implementations, the one or more recommendations may include information indicating next best actions for addressing portions of the cloud application with defects, information indicating how defects, similar to the defects in the portions of the cloud application, were previously corrected, information indicating how the cloud application can be improved based on prior improvements made to similar cloud applications, and/or the like. In some implementations, the result analysis model may compare expected results of the test classes and the test classes execution results in order to aid in generation of the one or more recommendations.

In some implementations, the result analysis model may generate a code coverage report based on the analysis of the test classes execution results. In some implementations, the code coverage report may include report indicating a degree to which the source code of the cloud application is tested and certified when the test classes are executed by the execution engine of the testing platform. In some implementations, many different metrics may be used to calculate the code coverage of the cloud application, such as a percentage of subroutines of the cloud application called during execution of the test classes, a percentage of statements called during execution of the test classes, and/or the like.

In this way, testing platform 220 may utilize the fourth artificial intelligence model to generate the analysis of and the recommendations for the results, and the code coverage report.

As further shown in FIG. 4, process 400 may include providing the analysis of the results, the recommendations for the results, and/or the code coverage report (block 470). For example, testing platform 220 may provide (e.g., using computing resource 224, processor 320, communication interface 370, and/or the like) the analysis of the results, the recommendations for the results, and the code coverage report. In some implementations, testing platform 220 may provide the analysis of the test results, the one or more recommendations, and the code coverage report to user device 210, and user device 210 may provide the analysis of the test results, the one or more recommendations, and the code coverage report for display to a user of user device 210. In some implementations, the user of user device 210 may utilize the analysis of the test results, the one or more recommendations, and/or the code coverage report to perform an action on the cloud application. For example, the user may attempt to correct a defect in a portion of the source code of the cloud application by rewriting the portion of the source code, deleting the portion of the source code, correcting the portion of the source code, and/or the like.

In this way, testing platform 220 may provide the analysis of the results, the recommendations for the results, and the code coverage report.

As further shown in FIG. 4, process 400 may include automatically causing an action to be performed based on the analysis of the results, the recommendations for the results, and/or the code coverage report (block 480). For example, testing platform 220 may automatically cause (e.g., using computing resource 224, processor 320, communication interface 370, and/or the like) an action to be performed based on the analysis of the results, the recommendations for the results, and/or the code coverage report. In some implementations, testing platform 220 may automatically perform an action, or cause an action to be performed, based on the analysis of the test results, the one or more recommendations, and/or the code coverage report. In some implementations, the action may include automatically correcting any defects in the source code of the cloud application, automatically deleting portions of the source code with defects, automatically replacing portions of the source code with defects, automatically notifying a developer of the cloud application about the any defects in the source code, and/or the like.

In this way, testing platform 220 may automatically cause the action to be performed based on the analysis of the results, the recommendations for the results, and/or the code coverage report.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a testing platform that utilizes artificial intelligence (AI) to automatically test a cloud application and provide and/or implement recommendations for the cloud application based on results of testing the cloud application. For example, the testing platform may utilize a first AI model to generate test cases and test data based on application information associated with the cloud application, and may utilize a second AI model to generate optimized test cases and test data based on the test cases and the test data. The testing platform may utilize a third AI model to generate test classes based on the optimized test cases and test data, and may execute the test classes to generate results. The testing platform may utilize a fourth AI model to generate recommendations for the cloud application, based on the results, and may automatically cause the recommendations to be implemented.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive application information associated with a cloud application provided in a cloud computing environment,
         the application information including source code for the cloud application;
      utilize a first artificial intelligence model to automatically generate test cases based on a static code analysis of the cloud application, control flow information derived from the source code for the cloud application, and patterns in test data;
      utilize a second artificial intelligence model to generate optimized test cases and optimized test data based on the test cases and the test data,
         where the one or more processors, when utilizing the second artificial intelligence model to generate the optimized test cases and the optimized test data, are to:
            select a representative set of test cases, from the test cases, as the optimized test cases when the representative set of test cases provides a same code coverage as all of the test cases,
               where the same code coverage is a degree to which the source code for the cloud application is tested and certified when all test classes are executed; and
            indicate a time to execute the optimized test cases based on usage of network resources by the test cases;
      utilize a third artificial intelligence model to generate the test classes based on the optimized test cases and the optimized test data;
      execute the test classes to generate results;
      utilize a fourth artificial intelligence model to generate at least one of:
         an analysis of the results,
         one or more recommendations for the cloud application based on the analysis of the results, or
         a code coverage report associated with the cloud application; and
      automatically cause an action to be performed based on the at least one of the analysis of the results, the one or more recommendations, or the code coverage report,
         the action being associated with the cloud application.

2. The device of claim 1, where the application information includes one or more of:
   metadata associated with the cloud application,
   training data for the first artificial intelligence model, or
   defect data associated with the cloud application.

3. The device of claim 1, where each of the test cases includes one or more of:
   a test case identifier,
   the test data,
   a test sequence,
   an expected result,
   an actual result, or
   status information.

4. The device of claim 1, where the one or more processors, when utilizing the second artificial intelligence model to generate the optimized test cases and the optimized test data, are to:
   remove a first particular test case from the test cases when the first particular test case cannot be used for testing the cloud application;
   remove a second particular test case from the test cases when the second particular test case is a duplicate of another one of the tests cases; and
   remove a third particular test case from the test cases when the third particular test case provides a same coverage as another one of the test cases,
      the test cases, with the first particular test case, the second particular test case, and the third particular test case removed, representing the optimized test cases.

5. The device of claim 1, where the one or more processors, when utilizing the third artificial intelligence model to generate the test classes, are to:
   cluster the optimized test cases and the optimized test data to generate clustered test cases and clustered test data; and
   utilize the clustered test cases, the clustered test data, and the application information, to generate the test classes, each test class including one or more of the clustered test cases.

6. The device of claim 1, where the one or more processors, when utilizing the fourth artificial intelligence model to generate the at least one of the analysis of the results, the one or more recommendations, or the code coverage report, are to:
   compare the results with predicted results for the test classes; and
   generate the at least one of the analysis of the results, the one or more recommendations, or the code coverage report based on comparing the results with the predicted results.

7. The device of claim 1, where each of the first artificial intelligence model, the second artificial intelligence model, the third artificial intelligence model, and the fourth artificial intelligence model includes a machine learning model.

8. A non-transitory computer-readable medium storing instructions, the instructions comprising:
   one or more instructions that, when executed by one or more processors, cause the one or more processors to:
      receive, from a user device, a request to test a cloud application provided in a cloud computing environment;
      receive application information associated with the cloud application based on the request,
         the application information including source code for the cloud application;
      utilize a first machine learning model to automatically generate test cases based on a static code analysis of the cloud application, control flow information derived from the source code for the cloud application, and patterns in test data;
      utilize a second machine learning model to generate optimized test cases based on the test cases,
         where the one or more instructions that cause the one or more processors to utilize the second machine learning model to generate the optimized test cases, cause the one or more processors to:
select a representative set of test cases, from the test cases, as the optimized test cases when the representative set of test cases provides a same code coverage as all of the test cases,
where the same code coverage is a degree to which the source code for the cloud application is tested and certified when all test classes are executed; and
indicate a time to execute the optimized test cases based on usage of network resources by the test cases;
utilize a third machine learning model to generate the test classes based on the optimized test cases;
execute the test classes to generate results;
utilize a fourth machine learning model to generate an analysis of the results; and
automatically cause an action to be performed based on the analysis of the results,
the action being associated with the cloud application and including at least one of:
correcting an error in the cloud application,
providing a recommendation to correct the error in the cloud application, or
generating code to improve the cloud application.

9. The non-transitory computer-readable medium of claim 8, where the instructions further comprise:
one or more instructions that, when executed by the one or more processors, cause the one or more processors to:
utilize the fourth machine learning model to generate:
one or more recommendations for the cloud application based on the analysis of the results, and
a code coverage report associated with the cloud application; and
provide the analysis of the results, the one or more recommendations, and the code coverage report for display to the user device.

10. The non-transitory computer-readable medium of claim 8, where the application information includes one or more of:
metadata associated with the cloud application,
training data for the first machine learning model, or
defect data associated with the cloud application.

11. The non-transitory computer-readable medium of claim 8, where the one or more instructions, that cause the one or more processors to utilize the second machine learning model to generate the optimized test cases, cause the one or more processors to:
remove particular test cases from the test cases when one of:
the particular test cases cannot be used for testing the cloud application,
the particular test cases are duplicates of other ones of the tests cases, or
the particular test cases provide a same coverage as the test cases,
the test cases, with the particular test cases removed, representing the optimized test cases.

12. The non-transitory computer-readable medium of claim 8, where the one or more instructions, that cause the one or more processors to utilize the third machine learning model to generate the test classes, cause the one or more processors to:
cluster the optimized test cases to generate clustered test cases; and
utilize the clustered test cases and the application information to generate the test classes, each of the test classes including one or more of the clustered test cases.

13. The non-transitory computer-readable medium of claim 8, where the cloud application includes one of:
an information as a service (IaaS) cloud application,
a platform as a service (PaaS) cloud application, or
a software as a service (SaaS) cloud application.

14. The non-transitory computer-readable medium of claim 8, where the one or more instructions, that cause the one or more processors to utilize the fourth machine learning model to generate the analysis of the results, cause the one or more processors to:
compare the results with predicted results for the test classes; and
generate the analysis of the results based on comparing the results with the predicted results.

15. A method, comprising:
receiving, by a device, application information associated with a cloud application provided in a cloud computing environment,
the application information including one or more of:
source code for the cloud application,
metadata associated with the cloud application,
training data, or
defect data associated with the cloud application;
utilizing, by the device, a first artificial intelligence model to automatically generate test cases based on a static code analysis of the cloud application, control flow information derived from the source code for the cloud application, and patterns in test data,
each of the test cases including one or more of:
a test case identifier,
test data,
a test sequence,
an expected result,
an actual result, or
status information;
utilizing, by the device, a second artificial intelligence model to generate optimized test cases based on the test cases,
where utilizing the second artificial intelligence model to generate the optimized test cases includes:
selecting a representative set of test cases, from the test cases, as the optimized test cases when the representative set of test cases provides a same code coverage as all of the test cases,
where the same code coverage is a degree to which the source code for the cloud application is tested and certified when all test classes are executed; and
indicating a time to execute the optimized test cases based on usage of network resources by the test cases;
utilizing, by the device, a third artificial intelligence model to generate the test classes based on the optimized test cases;
executing, by the device, the test classes to generate results;
utilizing, by the device, a fourth artificial intelligence model to generate:
an analysis of the results, and
one or more recommendations for the cloud application based on the analysis of the results; and automatically causing, by the device, an action to be performed based on the analysis of the results or the one or more recommendations,
the action being associated with the cloud application.

16. The method of claim 15, further comprising:
providing the analysis of the results and the one or more recommendations for display.

17. The method of claim 15, where the cloud application includes one of:
an information as a service (IaaS) cloud application,
a platform as a service (PaaS) cloud application, or
a software as a service (SaaS) cloud application.

18. The method of claim 15, where utilizing the second artificial intelligence model to generate the optimized test cases includes:
removing particular test cases from the test cases when one of:
the particular test cases cannot be used for testing the cloud application,
the particular test cases are duplicates of other ones of the tests cases, or
the particular test cases provide a same coverage as the test cases,
the test cases, with the particular test cases removed, representing the optimized test cases.

19. The method of claim 15, where utilizing the third artificial intelligence model to generate the test classes includes:

combining the optimized test cases into groups of test cases; and
utilizing the groups of test cases and the application information to generate the test classes,
each of the test classes including one or more of the groups of test cases.

20. The method of claim 15, further comprising:
providing one or more chat bots to assist with utilizing at least one of:
the first artificial intelligence model,
the second artificial intelligence model,
the third artificial intelligence model, or
the fourth artificial intelligence model.

21. The method of claim 15, where the application information comprises historic information relating to previous application defects.

22. The method of claim 15, where the application information comprises organization information relating to a structure of an organization.

23. The method of claim 15, where the first artificial intelligence model includes one or more of:
a pattern analysis model,
a predictive analysis model, or
a data mining model.

24. The method of claim 15, where the second artificial intelligence model includes:
a regression analysis model.

* * * * *